(12) United States Patent
Barthelemy et al.

(10) Patent No.: US 10,415,122 B2
(45) Date of Patent: Sep. 17, 2019

(54) CERMET ELECTRODE MATERIAL

(71) Applicant: Rio Tinto Alcan International Limited, Montreal (CA)

(72) Inventors: Christian Barthelemy, Voiron (FR); Ariane Marmottant, Charnecles (FR); Véronique Laurent, Saint Egrève (FR); Sylvie Bouvet, Vinay (FR); Vincent Stabrowski, Grenoble (FR)

(73) Assignee: ELYSIS LIMITED PARTNERSHIP, Montreal (CA)

( * ) Notice: Subject to any disclaimer, the term of this patent is extended or adjusted under 35 U.S.C. 154(b) by 132 days.

(21) Appl. No.: 15/563,656

(22) PCT Filed: Mar. 23, 2016

(86) PCT No.: PCT/IB2016/000445
§ 371 (c)(1),
(2) Date: Oct. 2, 2017

(87) PCT Pub. No.: WO2016/156973
PCT Pub. Date: Oct. 6, 2016

(65) Prior Publication Data
US 2018/0073109 A1 Mar. 15, 2018

(30) Foreign Application Priority Data
Apr. 3, 2015 (FR) .................................. 15 00694

(51) Int. Cl.
*C22C 32/00* (2006.01)
*C25C 7/02* (2006.01)
(Continued)

(52) U.S. Cl.
CPC .......... *C22C 32/001* (2013.01); *C22C 1/1078* (2013.01); *C25C 3/06* (2013.01);
(Continued)

(58) Field of Classification Search
None
See application file for complete search history.

(56) References Cited

U.S. PATENT DOCUMENTS 4,374,050 A   2/1983   Ray
4,397,729 A * 8/1983   Duruz ..................... C25C 7/025
                                                          204/243.1
(Continued)

FOREIGN PATENT DOCUMENTS

AU   2004222545 A1   9/2004
CN       86107658 A   8/1987
(Continued)

OTHER PUBLICATIONS

Olsen et al, Nickel ferrite as inert anodes in aluminium electrolysis: Part I Material fabrication and preliminary testing, Journal of Applied Electrochemistry, vol. 29, No. 3, Mar. 1999, pp. 293-299 (Year: 1999).*

(Continued)

*Primary Examiner* — Harry D Wilkins, III
(74) *Attorney, Agent, or Firm* — Banner & Witcoff, Ltd.

(57) ABSTRACT

A cermet material includes as mass percentages, at least:
  50% to 90% of a metallic phase containing an alloy of copper (Cu) and nickel (Ni), and
  10% to 50% of an oxide phase containing at least iron, nickel and oxygen with the following proportion by mass of Ni: 0.2%≤Ni≤17%.

An electrode, preferably an anode, may include this cermet material.

26 Claims, 5 Drawing Sheets

(51) Int. Cl.
*C25C 3/12* (2006.01)
*C22C 1/10* (2006.01)
*C25C 3/06* (2006.01)

(52) U.S. Cl.
CPC ............... *C25C 3/12* (2013.01); *C25C 7/025* (2013.01); *B22F 2999/00* (2013.01)

(56) References Cited

U.S. PATENT DOCUMENTS

| | | | |
|---|---|---|---|
| 4,454,015 A | 6/1984 | Ray et al. | |
| 4,472,258 A * | 9/1984 | Secrist | C25C 3/12 204/292 |
| 4,495,049 A * | 1/1985 | Secrist | C25C 3/12 204/291 |
| 4,552,630 A * | 11/1985 | Wheeler | C25C 3/12 204/247.3 |
| 4,871,437 A * | 10/1989 | Marschman | C25C 3/12 204/291 |
| 4,871,438 A | 10/1989 | Marschman et al. | |
| 5,279,715 A * | 1/1994 | La Camera | C25C 3/04 204/247.4 |
| 6,103,090 A * | 8/2000 | de Nora | C25C 7/025 204/243.1 |
| 6,423,204 B1 * | 7/2002 | Ray | B22F 1/025 204/243.1 |
| 2003/0070937 A1 | 4/2003 | Duruz et al. | |
| 2004/0089558 A1 | 5/2004 | Weirauch et al. | |
| 2004/0089852 A1 * | 5/2004 | Dimilia | C25C 3/12 252/519.1 |
| 2007/0056848 A1 | 3/2007 | Tailhades et al. | |
| 2011/0053041 A1 | 3/2011 | Tucker et al. | |
| 2017/0130351 A1 * | 5/2017 | Barthelemy | C25C 3/12 |
| 2018/0148853 A1 * | 5/2018 | Nakazawa | B32B 15/043 |

FOREIGN PATENT DOCUMENTS

| | | |
|---|---|---|
| CN | 1465749 A | 1/2004 |
| CN | 101 983 250 A | 3/2011 |
| CN | 102 732 769 A | 10/2012 |
| CN | 102 766 793 A | 11/2012 |
| CN | 104 388 792 A | 3/2015 |
| FR | 2533591 A1 | 3/1984 |
| GB | 1433805 A * | 4/1976 |
| WO | 99/36591 A1 | 7/1999 |
| WO | 00/06803 A1 | 2/2000 |
| WO | 01/31090 A1 | 5/2001 |
| WO | 02/066710 A1 | 8/2002 |
| WO | 02/083992 A2 | 10/2002 |
| WO | 2004/082355 A2 | 9/2004 |
| WO | 2005017234 A1 | 2/2005 |
| WO | 2005/035813 A2 | 4/2005 |

OTHER PUBLICATIONS

Olsen et al, Nickel ferrite as inert anodes in aluminium electrolysis: Part II Material performance and long-term testing, Journal of Applied Electrochemistry, vol. 29, No. 3, Mar. 1999, pp. 301-311 (Year: 1999).*

Tao et al, Microstructural Evolution of a Nickel Ferrite-Copper Alloy Cermet During Sintering and High-Temperature Oxidation, Journal of the American Chemical Society, vol. 95, No. 10, Jun. 2012, pp. 3031-3036 (Year: 2012).*

Baco-Carles et al, Preparation and electrical properties of dense micro-cermets made of nickel ferrite and metallic copper, Solid State Sciences, vol. 11, No. 8, Aug. 2009, pp. 1503-1506 (Year: 2009).*

EPO Search Opinion from EP 3277855 (corresponding European application to the present PCT application), Nov. 2018 (Year: 2018).*

Jul. 13, 2016—International Search Report and Written Opinion—PCT/IB2016/000445.

Fabien Rioult et al.; "High Temperature Oxidation of a Cu—Ni Based Cermet: Kinetic and Microstructural Study", Journal of the American Cermaic Society; vol. 89, No. 3, Mar. 1, 2006.

Jul. 13, 2016—(WO) English Translation of the Written Opinion—App No. 201PCT/IB2016/000445—Eng Tran.

* cited by examiner

CERMET ELECTRODE MATERIAL

CROSS-REFERENCE TO RELATED APPLICATIONS

This application is a U.S. National Stage application under 35 U.S.C. § 371 of International Application PCT/IB2016/000445 (published as WO 2016/156973 A1), filed Mar. 23, 2016, which claims priority to French Patent Application No. 1500694, filed Apr. 3, 2015, and the present application claims priority to and the benefit of both of these prior applications, each of which is incorporated by reference in its entirety.

The invention relates to electrode materials, particularly cermet materials used in the composition of anode material for the production of aluminum by electrolysis. It relates more specifically to cermet materials used for the manufacture of so-called "inert" or "non-consumable" anodes.

The following description refers more specifically to the use of the cermet material, the subject of the present invention, used in the composition of the inert anode material for the production of aluminum by means of an igneous electrolysis process. However, the mention of this industrial application in the description does not in any way limit the scope of the invention. The present invention may relate to other industrial applications of the cermet material described below.

Metallic aluminum is produced industrially by igneous electrolysis, namely by electrolytic reduction of alumina in solution in a bath based on molten cryolite, known as an electrolytic bath, using the Hall-Héroult process. The electrolytic reduction is carried out in electrolytic cells comprising an electrolytic cell provided with carbon cathode elements, and one or more anodes. The electrolytic bath is contained in the cell and the anodes are partially immersed in the electrolytic bath. The electrolysis current helps to maintain the electrolytic bath at the required temperature by means of the Joule effect. The electrolytic cell is fed regularly with alumina so as to compensate for the alumina consumed by the electrolytic reaction.

In the standard technology, anodes are made of carbonaceous material and the electrolysis is conducted at a temperature typically of the order of 950° C. As anodes made of carbonaceous material are progressively consumed during electrolysis, it is necessary to continuously adjust the height of the part of the anode which is immersed in the bath and work on the cell to perform anode replacement.

In addition, the consumption of anodes:
  produces carbon dioxide (more than two tons of carbon dioxide per ton of aluminum produced), which contributes to the greenhouse effect, and
  releases sulfur dioxide due to the presence of sulfur in the raw materials used to manufacture the anode.

The development of an alumina electrolysis technology using "inert" or "non-consumable" anodes seeking to resolve these problems inevitably encounters the difficulty of making anodes meet with different, antagonistic quality criteria.

The anodes must be sufficiently conductive at operating temperature so as not to unduly increase the power consumed by this technology.

Moreover, the anodes must resist corrosion in aggressive cryolite baths so as to have a sufficiently long service life and to avoid contamination of the electrolyte and aluminum with undesirable elements.

Finally, it must be possible to handle the anodes. This requires certain mechanical properties: fragile anodes would be unusable in industrial processes.

To meet the above criteria, namely conductivity, corrosion resistance and durability, it is proposed to use monolithic ceramic parts for the manufacture of these inert anodes.

For example, patent applications WO02/066710, WO02/083992 and US2004/089558 describe various compositions of oxides which may allow the production of ceramic inert anodes, for which the amount of metallic phase is generally less than 10% by weight. However, the electrical conductivity of this type of anode and their mechanical properties turn out to be insufficient.

It has also been proposed to use fully metallic parts to manufacture these inert anodes. For example, patent applications WO99/36591 and WO00/06803 describe such inert anodes which are all-metal. However, the corrosion resistance of these anodes in cryolite baths is still insufficient.

Finally, it has been proposed to use composite materials with a ceramic matrix containing one or more metallic phases as electrode materials, so as to combine the respective advantages of the metallic phase and the ceramic phase. Such composite materials, which contain at least one ceramic phase and at least one metallic phase, are known as "cermet material".

The metallic phases of these cermet materials make it possible to improve the mechanical properties of the electrodes and their conductivity, while the ceramic phases make it possible to improve corrosion resistance in the cryolite baths.

However, the lack of stability of the various metallic and ceramic phases during extended immersion of such cermet material anodes in cryolite baths tends to limit their service life and cause contamination of the electrolyte and the aluminum.

Many patent applications are related to this type of cermet anode material.

For example, one can cite international application WO2004/082355 which discloses a method of making an cermet inert anode of the type NiO—$NiFe_2O_4$-M comprising at least a nickel monoxide phase N, a nickel spinel phase S containing iron and nickel, and a metallic phase M containing copper and nickel, said method being characterized in that it comprises:
  preparing an initial mixture including at least one precursor of said monoxide N and spinel S phases, a precursor of the metallic phase M and an organic binder, the proportion of organic binder in the initial mixture being less than 2.0% by weight and the precursor of the metallic phase comprising a metallic powder containing copper and nickel,
  a shaping operation of the mixture to form a green anode of predetermined shape,
  a sintering operation of the green anode at a temperature above 900° C. in a controlled atmosphere containing at least one inert gas and oxygen.

This method, which improves the manufacturing of the anode by reducing the amount of binder, does not completely solve the problem of anode stability in the cryolite bath. In particular, it was found that the electrical conductivity of the nickel spinel phase $NiFe_2O_4$ decreased during electrolysis, which conditioned the service life of the anode.

International application WO2005/035813 discloses a method of anode manufacturing containing a cermet material in which one of the oxide constituent is a metallic element capable of being reduced in whole or in part during a reduction operation during the manufacturing process.

This method, which improves the manufacturing of the anode by reducing the amount of binder, does not completely solve the problem of anode stability in the cryolite bath.

International application WO01/31090 discloses a cermet inert anode comprising a ceramic phase represented by the formula $Ni_xFe_{2y}M_zO_{(3y+x+z)\pm\delta}$, where M represents at least one metal selected from Zn, Co, Al, Li, Cu, Ti, V, Cr, Zr, Nb, Ta, W, Mb, Hf and rare earths, preferably Zn and/or Co, x is between 0.1 and 0.99, y is between 0.0001 and 0.9, z is between 0.0001 and 0.5, and δ is between 0 and approximately 0.03. This cermet inert anode also contains a metallic phase such as Cu, Ag, Pd, Pt, Au, Rh, Ru, Ir and/or Os. A service life compatible with industrial conditions of use has not been demonstrated for this type of anode.

It is therefore noted that the electrode materials, particularly the cermet materials, known from prior art are not fully satisfactory as materials to be used in the composition of the inert anode material for the production of aluminum which operate optimally (i.e. with low power consumption) and with an acceptable service life from an industrial point of view.

The present invention proposes to overcome the drawbacks detailed above that affect electrode materials, particularly cermet materials, known from prior art.

The inventors of the present invention have quite surprisingly developed a new cermet material, for use in the composition of an inert anode material developed for the production of aluminum which reconciles the following parameters:
- robustness and thermal shock resistance higher than the cermet material formulations already known, this being due to a greater proportion of metal;
- improved electrical conductivity as compared to cermet materials known from prior art;
- very satisfactory corrosion resistance: no measurable geometric wear until 506 hours of electrolysis is observed with the cermet material according to the invention;
- the cermet material according to the invention does not induce loss of metal such as nickel which could pollute the aluminum produced during electrolysis to a level such that it would not be marketable;
- resistance to high current densities, namely adequate behavior at 1.2 A/cm$^2$;
- a remarkable resistance to oxidation at 930° C. in air.

The cermet material according to the invention comprises, as percentages by mass, at least:
- 50% to 90%, preferably 60% to 80%, of a metallic phase which contains at least one alloy of copper (Cu) and nickel (Ni), said alloy comprising as percentages by mass:
  - 35% to 75%, preferably 40% to 60%, more preferably 45% to 55% of nickel;
  - 25% to 65%, preferably 40% to 55%, more preferably 45% to 55% of copper;
  - optionally iron (Fe), the percentage by mass of iron in said alloy not exceeding 20%, preferably said percentage by mass of iron is between 2% and 15%, more preferably between 4% and 10%;
- 10% to 50%, preferably from 20% to 40%, of an oxide phase containing at least iron, nickel and oxygen with the following proportion by mass of nickel: 0.2%≤Ni≤17%.

In the oxide phase of the cermet material according to the invention, nickel is present in small amounts relative to other metals forming the oxide phase and in particular relative to iron.

Iron may be the only other metal in addition to nickel in the oxide phase, in which case the proportion by mass of iron in the oxide phase is as follows: 60%≤Fe≤78%. Iron is therefore greatly predominant relative to nickel.

The oxide phase may further contain at least one metal (M) which is selected from aluminum (Al), cobalt (Co), chromium (Cr), copper (Cu), manganese (Mn), titanium (Ti), zirconium (Zr), tin (Sn), vanadium (V), niobium (Nb), tantalum (Ta), yttrium (Y), hafnium (Hf) or a combination of these metals. These metals M take the place of iron in the structure of the oxide in the oxide phase. They are especially present in small amounts in the oxide phase relative to iron and advantageously selected to improve conductivity of the oxide phase, sintering of the cermet material and/or resistance to corrosion from the cryolite bath.

The oxide phase of the cermet material according to the invention may comprise:
a monoxide phase of composition $Ni_xM_yFe_{1-x-y}O$ with the following proportions by mass:
0.3%≤Ni≤17%,
60%≤Fe≤78%.
0≤M≤10%,
and/or
a nickel ferrite oxide phase of composition $Ni_xM_yFe_{3-x-y}O_4$ with the following proportions by mass:
0.2%≤Ni≤13%,
60%≤Fe≤72%,
0≤M≤8%.

As an indication, the ranges of mass proportions of Ni and Fe mentioned above can also be expressed when:
the oxide phase comprises a monoxide phase of composition $Ni_xFe_{1-x}O$ which does not contain metal M (y=0) by: 0.004≤x≤0.2,
the oxide phase comprises a nickel ferrite oxide phase of composition $Ni_xFe_{3-x}O_4$ which does not contain metal M (y=0) by: 0.01≤x≤0.5, The nickel ferrite oxide phase of the cermet material has a spinel structure. Spinel structure means a crystalline structure with composition of type AB2O4 where A is a cation in a tetrahedral site (surrounded by four oxygens) and B are two cations in octahedral sites (surrounded by six oxygens). This type of compact cubic structure is particularly advantageous in aggressive conditions such those within a cryolite bath for aluminum production.

In the cermet material according to the invention, the metallic phase and the oxide phase are percolating, which means that the networks formed by the oxide phase and the metallic phase are intimately interwoven and pass through the cermet material continuously. This has the advantage that the cermet material according to the invention maintains good resistance over time.

Preferably, when the oxide phase of the cermet material comprises a nickel ferrite oxide phase, said nickel oxide ferrite phase is of composition $Ni_xM_yFe_{3-x-y}O_4$ with the following mass proportions:
0.2%≤Ni≤10%, preferably 0.2%≤Ni≤5%
63%≤Fe≤72%, preferably 68%≤Fe≤72%
0≤M≤4%, preferably 0≤M≤2%.

As a guide, the ranges of mass proportions of Ni and Fe mentioned above can still be expressed when the oxide phase comprises a nickel ferrite oxide phase of composition $Ni_xFe_{3-x}O_4$ which does not contain metal M (y=0) by: 0.01≤x≤0.3, and preferably 0.01≤x≤0.1.

Advantageously, when the oxide phase of the cermet material comprises a monoxide phase, said monoxide phase is of composition $Ni_xM_yFe_{1-x-y}O$ with the following mass proportions:

0.3%≤Ni≤13%, preferably 0.3%≤Ni≤8%
65%≤Fe≤78%, preferably 70%≤Fe≤78%
0≤M≤4%, preferably 0≤M≤2%.

As a guide, the ranges of mass proportions of Ni and Fe mentioned above can still be expressed when the oxide phase comprises a monoxide phase of composition $Ni_xFe_{1-x}O$ by: $0.004 \leq x \leq 0.16$, and preferably $0.004 \leq x \leq 0.1$.

In one embodiment of the invention, the metallic phase of the cermet material further comprises at least one rare earth element, preferably a rare earth element selected from yttrium (Y), cerium (Ce), lanthanum (La) and neodymium (Nd).

The rare earth element can represent up to 5% of the mass of the metallic phase. More preferably, this mass percentage of rare earth is less than or equal to 2%. The presence of the rare earth element in the metallic phase enhances the quality of the grain boundaries and so prevents the formation of fluorides or soluble oxyfluorides that could contaminate the cryolite bath.

Given the high proportion of the metallic phase in the cermet material according to the invention, electrical conductivity is close to that of a metal both in terms of its change with temperature and for the value reached. Conductivity at room temperature is from 4000 to 5000 S/cm, and at a temperature of 1000° C., it is from 2000 to 3000 S/cm.

With the specific composition of the cermet material according to the invention described above, said cermet material has the advantage that a protective and adherent layer of thick nickel ferrite between about 15 µm and 30 µm forms on the surface of said cermet material, from the beginning of electrolysis when the cermet material is used in the material composition of an inert anode immersed in a cryolite bath or during treatment consisting of pre-oxidation (for example in air between 900 and 1000° C., for a time preferably between about 2 and 10 hours) of the inert anode containing this cermet material which is carried out before it is used in electrolysis.

This protective layer has a composition which tends towards the composition $Ni_{0.9}M_yFe_{2.1-y}O_4$. And, during electrolysis, due to balancing with the cryolite bath containing alumina on the surface of the anode, the protective layer of an oxide phase initially containing no metal M (y=0) tends towards the composition $Ni_{0.9}Fe_2Al_{0.1}O_4$. This nickel ferrite phase is less conductive than the oxide phase of the cermet material but it is more stable, less soluble in the cryolite bath and therefore remains on the surface of the anode.

This is why the invention also relates to a processed cermet material obtainable after pre-ation treatment of a cermet material as described above. Advantageously, the pre-oxidation treatment is carried out in air between 900° C. and 1000° C. for a time between about 2 and 10 hours. The only effect of the pre-oxidation treatment is to form the protective layer of nickel ferrite as described above on the surface of the cermet material.

Another subject of the invention is therefore a processed cermet material which is characterized in that it is a cermet material such as described above and is coated completely or partially with a protective layer of composition $Ni_{0.9}M_yFe_{2.1-y}O_4$, the thickness of this protective layer being advantageously between approximately 15 and 30 microns.

Therefore, in the context of the present invention, "cermet material according to the invention" means both the cermet material such as described above and the processed cermet material which has just been described, which differs from the cermet material only in that it further comprises a protective layer of nickel ferrite.

The cermet material according to the invention comprises a large amount of metallic phase which provides a reservoir of metal species, in particular nickel. In addition, the oxide phase of the cermet material is rich in iron and low in nickel content.

This is why the protective layer of nickel ferrite on the surface of the cermet material according to the invention regenerates continuously throughout electrolysis due to the supply of nickel from the interior of the cermet material and the dissolution of this same nickel in the oxide phase. The oxidizing environment on the surface of the cermet material and rich in nickel around nickel ferrite very rich in iron tends to move the stoichiometry of nickel ferrite towards a balance where the nickel ferrite has a higher proportion of nickel, close to $Ni_{0.9}M_yFe_{2.1-y}O_4$.

In other words, the oxide phase of the cermet material which may be a nickel ferrite oxide and/or a monoxide gives rise under oxidizing conditions (electrolysis and/or pre-oxidation treatment as mentioned above) to the formation of a protective surface layer of nickel ferrite rich in nickel that is adherent, coherent and renewed continuously during electrolysis.

During electrolysis, the oxide phase of the cermet material according to the invention which has a low nickel content tends to be attacked by the electrolyte. That is why this oxide phase with a low nickel content must be in direct contact with the metallic phase of the cermet material to allow a rapid supply of nickel from the metallic phase when this metallic phase is oxidized.

The high proportion of the metallic phase in the cermet material according to the invention confers very good electrical conductivity when used as inert anode material, whether after pre-oxidation treatment as described above or directly in the electrolysis cryolite bath.

In addition, this high content of the metallic phase in the cermet material maintains conductivity when the composition of the cermet material changes during electrolysis, because of the equilibrium of the phases that it comprises.

The upper limit of the metallic phase content of the cermet material according to the invention is selected so that said metallic phase does not interfere with the rapid regeneration from the oxide phase of the protective layer of nickel ferrite described above; too high a content of this metallic phase would result in the likelihood of passivation by formation of nickel fluorides and/or dissolution of copper oxide.

Moreover, the lower limit of the metallic phase content of the cermet material according to the invention is selected so that the metallic phase is present in such a way as to largely occupy the volume of said cermet material. The metallic phase is a percolating phase which is in direct contact with the oxide phase in order to permit rapid supply of nickel to this oxide phase. The metallic phase is also an important nickel reservoir to ensure regeneration of the protective layer of nickel ferrite over a substantial period of time, namely a period of time which corresponds at least to the period of use of an inert anode in cryolithite baths during electrolysis for the production of aluminum.

This lower limit of the metallic phase content in the cermet material is selected so as to ensure good electrical conductivity of the cermet material according to the invention.

The metallic phase of the cermet material according to the invention comprises at least one alloy of nickel and of copper. In this alloy, the nickel oxidizes before the copper and so enriches the oxide phase of the cermet material according to the invention, allowing the formation of the protective layer of nickel ferrite on the anode surface which is highly resistant to the cryolite bath. The nickel also protects the copper from oxidation.

Enriching the protective layer of nickel ferrite with nickel to compensate for its nickel deficit makes it possible to:
limit pollution of the cryolite bath and the aluminum produced during electrolysis with nickel which might be oxidized and that might have dissolved in said bath in the absence of the formation of this protective layer, and
avoid passivation of the inert anode by forming dense layers of non-conductive NiO.

The lower limit of the content by mass of nickel in the copper and nickel alloy is selected so that the nickel of the metallic phase of the cermet material according to the invention can oxidize over long periods, thereby inducing a perfectly adequate service life for the cermet material from an industrial point of view, and in particular for use in a cryolite bath during electrolysis for the production of aluminum.

The copper of the metallic phase, which is a more noble element than nickel, will remain in the metallic phase of the cermet material over long periods, thereby providing reduction conditions that are perfectly conducive to maintaining the composition of the oxide phase at an equilibrium that ensures a good compromise between resistance to the cryolite bath and electrical conductivity of the cermet material according to the invention.

The amount of copper in the metallic phase of the cermet material according to the invention is selected so that the copper is present throughout the electrolysis, but in sufficiently small amounts to prevent melting of the metal phase during preparation of the cermet material according to the invention when it is manufactured by powder metallurgy.

In one embodiment of the invention, iron may be present in the composition of the copper and nickel alloy of the metallic phase of the cermet material prior to its use as an inert anode material during electrolysis.

The mass content of iron in the metallic phase of the cermet material should be low, namely less than 20% and advantageously between 2 and 15%, preferably between 4 and 10%.

This low iron content in the metallic phase may result from the phase balancing of the cermet material during manufacture, and more particularly during sintering of the cermet material.

The iron content is kept low, and may be zero, in the metallic phase, because this iron in metallic form in the cermet material tends to oxidize quickly and then dissolve quickly in the cryolite bath, resulting in impurities in the bath and the aluminum produced, together with porosities in said cermet material.

The reference publication, "Inert anodes for aluminium electrolysis", $1^{st}$ edition, 2007, by Ioan Galasiu, Rodica Galasiu and Jomar Thonstad, states on page 447 that nickel ferrite-based inert anodes, should contain an excess of NiO due to the solubility of $Fe_2O_3$ greater than that of NiO. Quite surprisingly and advantageously, the cermet material according to the invention goes against this information advocating an excess of NiO to limit the solubility of iron in the cryolite bath for such anodes. The composition of the cermet material has, on the contrary, an excess of iron in the oxide phase and it has been observed during electrolysis that the iron oxide phase did not pollute the bath so as to make use of the cermet material for electrolysis inappropriate.

An upper limit of the iron mass content in the oxide layer was selected so as to create an iron and nickel oxide as a precursor of the protective layer of nickel ferrite and avoid making this phase of the cermet material according to the invention directly soluble in the cryolite bath. During electrolysis and on the surface of the inert anode, iron is likely to give rise to the formation of $Fe_2O_3$ or iron aluminates or iron fluorides which dissolve in the cryolite bath.

The oxide phase of the cermet material will lose a little iron during electrolysis. However, the fact that the metallic phase of the cermet material is predominant in this material means that the total amount of the iron oxide phase is low, so that the loss of iron in the cermet material as a whole is not detrimental to the purity of the cryolite bath and the aluminum produced.

The nickel in the oxide phase of the cermet material according to the invention contributes to the electronic equilibrium in said oxide phase. In the oxide phase, the content by mass of nickel is preferably chosen so that it is minimal compared to the iron content by mass in order to reduce nickel contamination in the aluminum produced during electrolysis because of the inevitable dissolution of the oxide phase mentioned above, behind the protective layer of nickel ferrite. When the oxide phase is a monoxide phase, the ratio of the mass content of nickel to iron may be in the following range: $0.004 \leq Ni/Fe \leq 0.26$, and when the oxide phase is a nickel ferrite oxide phase, the ratio of the mass content of nickel to iron may be in the following range: $0.004 \leq Ni/Fe \leq 0.21$.

In addition, during electrolysis, the nickel from oxidation of the metallic phase of the cermet material according to the invention will be dissolved in the oxide phase, due to the nickel sub-stoichiometry (in other words its low nickel content) in this oxide phase of the cermet material according to the invention. During electrolysis, the composition of the cermet material according to the invention changes towards phase equilibrium. In other words, the nickel sub-stoichiometry in the oxide phase of the cermet material has been chosen so as to cause the nickel of the metallic phase to move to the oxide phase under oxidizing conditions.

The raw materials to be used and the associated compositions of the different phases of the cermet material according to the invention can be calculated using thermodynamic software and verified experimentally via measurements using an electron microprobe or by EDX (Energy Dispersive X-ray spectrometry) on polished sections examined by SEM (scanning electron microscope).

The cermet material according to the invention can be used:
1) as the monolithic material of an electrode, preferably an inert anode; said monolith material may have been subjected prior to its immersion in a cryolite bath to pre-oxidation treatment (for example between 900° C. and 1000° C. in air for a period of between about 2 and 10 hours),
2) as a coating material, for example with a thickness of between about 0.5 and 20 mm, on a metal substrate (i.e. a metal core), in order to obtain an electrode, preferably an inert anode ,
3) as material for one or more intermediate layers between a metal substrate and a deposition of an oxide-rich cermet material, i.e. having a mass percentage of oxide phase greater than the mass percentage of the oxide phase of the cermet material according to the invention, or a pure oxide, together constituting an electrode, preferably an inert anode.

When the cermet material according to the invention is used as an intermediate layer of material, it creates a chemical gradient, allowing to accommodate the expansion of different materials of the electrode.

The present invention therefore also relates to a monolithic electrode, preferably an anode, formed of cermet material according to the invention as described above.

The present invention also relates to an electrode, preferably an anode, comprising a metal core covered wholly or partially with at least one layer of a cermet material according to the invention as described above.

In one embodiment of said electrode, the cermet material layer according to the invention is covered with a deposit of cermet material rich in oxide or with a pure oxide. The layer of cermet material according to the invention is then an intermediate layer as mentioned above. In this way, the invention relates to an electrode which is characterized in that the cermet material layer according to the invention is an intermediate layer arranged between the metal core and a layer of oxide-rich cermet material or pure oxide, that further includes said electrode.

In these embodiments of an electrode according to the invention which comprises a metallic core, said metallic core preferably comprises at least one alloy of nickel (Ni) and iron (Fe), the proportions by mass of Ni and Fe being the following:

40%≤Ni≤85%, preferably 55%≤Ni≤80%,
15%≤Fe≤60%, preferably 20%≤Fe≤45%.

Said metal core of the electrode material may further include copper (Cu) in the following mass proportion 5%≤Cu≤40%.

Advantageously, the proportions by mass of the metallic core are:

40%≤Ni≤70%;
20%≤Fe≤45%;
7%≤Cu≤20%.

The metallic core of the electrode material may further comprise at least one metal A chosen from aluminum (Al), cobalt (Co), chromium (Cr), manganese (Mn), molybdenum (Mo), titanium (Ti), zirconium (Zr), tin (Sn), vanadium (V), niobium (Nb), tantalum (Ta) and hafnium (Hf) or is a combination of these metals, the proportion by mass of metal A in the metallic core being as follows: 0.5%≤A≤30%.

Advantageously, the proportions by mass of the metallic core are:

40%≤Ni≤80%;
15%≤Fe≤40%;
0%≤Cu≤20%.
0.5%≤A≤15%.

In one embodiment of the invention, the metallic phase of the cermet material further comprises at least one rare earth element, preferably a rare earth element selected from yttrium (Y), cerium (Ce), lanthanum (La) and neodymium (Nd).

The rare earth represents up to 5% of the mass of the metallic core of the electrode.

An electrode according to the invention which comprises a cermet material and a metallic core as described above has the following advantages:

Because of the composition of the metallic core as described above, the metallic core provides the electrode with good electrical conductivity and good mechanical stability.

The mass percentage of iron between 15% and 60% that comprises the metallic core is particularly suitable for the metallic core to be able to supply the cermet material with iron. During electrolysis, the iron lost from the cermet material can be compensated for because some iron will move from the metallic core to the cermet material (because of oxidation phenomena), in particular via cationic defects in the structures of the oxide that said cermet material comprises.

In the metallic core, nickel confers refractiveness on the Ni—Fe alloy (namely mechanical temperature maintenance) and its resistance to oxidation.

The composition of the metallic core was chosen so that deterioration of the metallic core by oxidation and/or fluorination is avoided.

The metallic core has the advantage of locally maintaining a reducing potential which counteracts the oxidizing potential of the cermet material on the cryolite bath side, said oxidizing potential being linked to the electrolysis reaction of in the cryolite bath in which the electrode is immersed according to the invention.

Preferably, the electrode described above is an anode.

The invention also relates to an electrolytic cell comprising at least one electrode as described above.

The present invention also relates to a method of manufacturing the cermet material as described above consisting of a powder metallurgy method or a thermal spraying technique, said manufacturing method being characterized in that it uses as raw materials at least:

iron in metallic form or as an alloy, and optionally copper and nickel in metallic form or as an alloy, an oxide selected from nickel ferrite oxides $Ni_xFe_{3-x}O_4$, NiO, $Fe_2O_3$, CuO, $Cu_2O$, $CuFeO_2$, the spinel of type $Cu_xFe_{3-x}O_4$ with $0<x≤1$.

In one embodiment of the manufacturing process, a majority proportion of copper is provided in the form of oxide in order to allow the reduction reaction of copper oxide into metallic copper. Iron is advantageously supplied in metallic form in a quantity sufficient to allow complete reduction of the copper oxide into metallic copper. This solid-solid copper oxide reduction reaction by iron is the origin of the structure of the cermet material according to the invention consisting of two intertwined networks (or in other words two percolating phases) and the obtaining of an iron oxide and nickel phase rich in iron and low in nickel.

This oxygen input for the oxide phase via a copper oxide is preferred to a direct input via an iron oxide due to the spatial organization of the oxide and metallic phases resulting from the reduction reaction.

Advantageously, 30% to 100% of the copper is supplied in the form of copper oxide, such as CuO, $Cu_2O$, $Cu_xFe_{3-x}O_4$ with $0<x≤1$, $CuFeO_2$. Preferably more than 50% of the copper, and even more preferably more than 80% of the copper, is supplied in the form of copper oxide.

Advantageously, 30% to 100% of the iron is provided in the form of metallic iron. Preferably more than 50% of the iron, and even more preferably more than 80% of the iron, is supplied in the form of metallic iron.

In this way, the cermet material according to the invention may for example be made using a powder metallurgy process.

In the case of manufacture by powder metallurgy, the solid-solid copper oxide reduction reaction by iron occurs during sintering of the material after mixing and pressing the raw materials.

Such a manufacturing method is particularly advantageous when the cermet material according to the invention is to be used as the monolithic material for an inert anode for electrolysis.

Other manufacturing methods of the cermet material can also be envisaged, for example when the cermet material is intended to be applied as a coating on a metallic substrate or depending on the shape of the inert anode which it is desired to obtain, as well as the number of layers, their composition and thickness. These methods may be used separately or in combination.

For example, the metallic core of the inert anode may be manufactured using a method selected from molding, casting, (preferably investment casting or sand casting), or a hot working technique such as rolling, extrusion or by powder metallurgy.

Then the layer(s) of cermet material according to the invention can be applied to the metallic core using a method selected from:

spraying methods, for example:
plasma spraying,
supersonic flame spraying (HVOF—High Velocity Oxy-Fuel)
supersonic flame spraying (HPVOF—High-Pressure High Velocity Oxi-Fuel),
supersonic flame spraying (HVAF—High Velocity Air Fuel),
detonation gun,
cold spraying,
methods for applying layers by powder metallurgy such as natural sintering and hot isostatic pressing.

In one embodiment of the invention in which the metallic core has been prepared previously, the surface of the metallic core is advantageously subjected to a pretreatment in order to eliminate casting impurities and to improve the adhesion of the cermet material layer according to the invention.

In one embodiment of the invention, the inert anode may also comprise one or more intermediate layers made up of the cermet material according to the invention which are arranged between the metallic core and a layer of oxide-rich cermet material, or pure oxide.

The intermediate layer formed from the cermet material according to the invention helps to accommodate the mechanical stresses due to differences in thermal expansion coefficients of the metallic core and the layer of oxide-rich cermet material, or pure oxide.

The thickness of the intermediate layer may be between one hundred microns and several millimeters.

The inert anode can be manufactured by co-sintering, additive manufacturing or by using a laser process (e.g., laser welding or laser sintering).

After manufacture, the metallic core of the anode is evenly coated with at least one dense and adherent layer of a cermet material according to the invention.

When the cermet material according to the invention is used as a monolithic anode material, or it is deposited on a metallic core in order to obtain an anode, a pre-oxidation treatment may be performed so that there appears on the surface of said cermet material, and therefore of the inert anode, the protective layer of dense nickel ferrite, nickel-rich as detailed above which is only slightly soluble in an electrolysis cryolite bath.

As already explained, without any pre-oxidation treatment, the protective layer will be formed directly during insertion of the anode material into the cryolite bath and the start of electrolysis, which creates favorable conditions for oxidation of the surface of the anode material.

EXPERIMENTAL SECTION

Cermet materials according to the invention were prepared by mixing powders in the following mass proportions:
12% of $NiFe_2O_4$;
3% of Cu;
32% of CuO;
5% of Ni;
48% of an Ni—Fe alloy (the mass contents of nickel and iron in this alloy were 50%).

Sintering was then carried out in argon at 1250° C. so as to obtain monolithic anodes consisting of a cermet material according to the invention.

Finally, the resulting monolithic anodes were subjected to a pre-oxidation treatment in air at 930° C. for 9 hours.

For all the experiments performed on said anodes, the electrolysis conditions were as follows: a cryolite bath with an initial cryolitic ratio of 2.2 and containing as mass percentages 5% of $CaF_2$, and 7.5% of alumina. The cryolitic ratio is the ratio in molar percentages of NaF to $AlF_3$.

The bath temperature was kept at 960° C. with a current of 0.6 A/cm² to 0.8 A/cm². The electrolysis potential was stable with a standard deviation of about 0.25V including variations in the metal layer throughout the testing period.

Observations of sections of anodes after electrolysis, coating and cutting showed that the inside of said anodes was basically unchanged, after 96 hours, 211 hours and 506 hours of electrolysis.

These observations demonstrate the excellent performance of the cermet material according to the invention when used as an inert anode during electrolysis, over quite remarkable time periods (up to 506 hours). These experiments have demonstrated the value of the cermet material according to the invention from an industrial standpoint.

Figure 1:
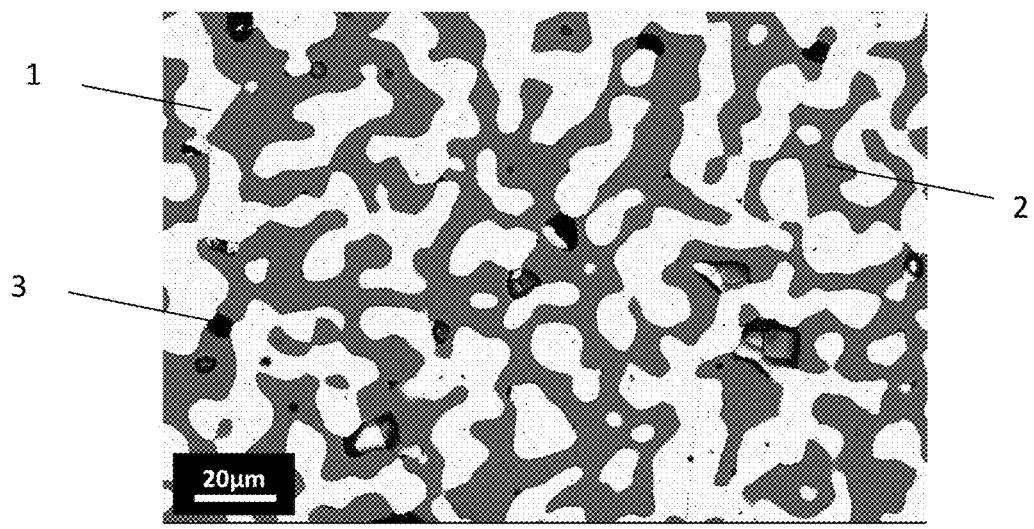
FIG. 1 is a photograph of an observation by backscattered electron SEM of a portion at the core of a monolithic anode made up of a cermet material according to the invention after pre-oxidation treatment.

FIG. 1 is a photograph of an observation by backscattered electron SEM of a portion at the core of a monolithic anode made up of a cermet material according to the invention which was obtained from the powder mixture and sintering described above and after pre-oxidation treatment.

Figure 2:
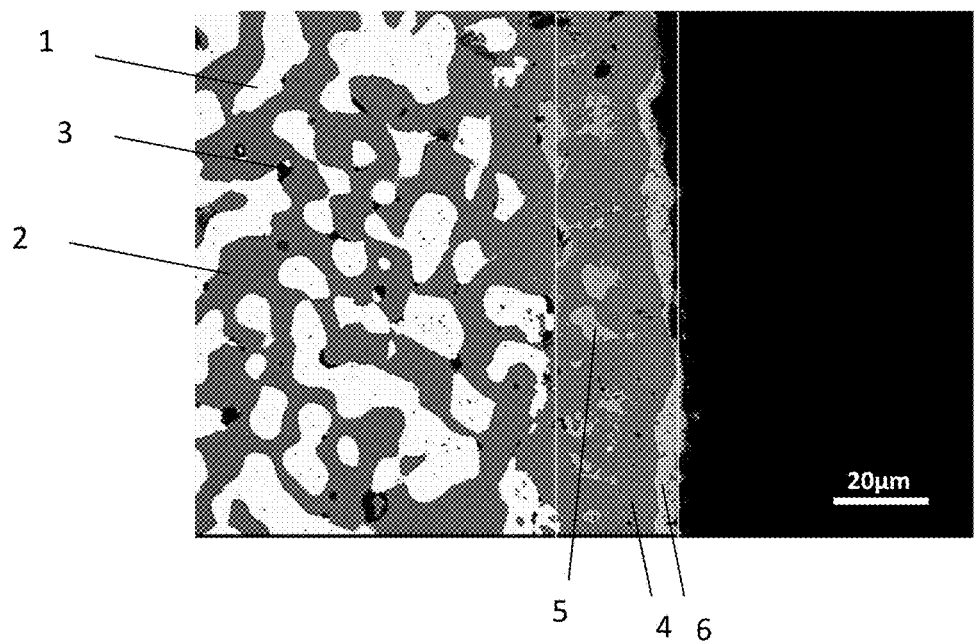
FIG. 2 is a photograph of an observation by backscattered electron SEM of a portion on the surface of the monolithic anode made up of a cermet material according to the invention shown in FIG. 1.

FIG. 2 is a photograph of an observation by backscattered electron SEM of a portion on the surface of the monolithic anode shown in part in FIG. 1.

In the photographs in FIGS. 1 and 2, the different phases in the presence of the cermet material can be seen:
the metallic phase 1 of nickel and copper alloy (white areas),
the phase 2 of nickel ferrite oxide $Ni_xFe_{3-x}O_4$ (dark gray areas),
porosities 3 (black spots),
In addition, the photograph in FIG. 2 shows:
a monoxide phase 5 of $Ni_xFe_{1-x}O$ (light gray areas),
a nickel ferrite phase 4 of composition $Ni_{0.9}Fe_{2.1}O_4$ at the surface of the cermet material (dark gray areas) corresponding to the protective layer mentioned above,
a copper-rich oxide phase 6.

As explained above, the nickel ferrite layer that forms on the surface of the cermet material according to the invention is particularly advantageous because it is adherent and coherent, which contributes to the excellent performance of said cermet material, even under the aggressive conditions found for example in a cryolite bath used during electrolysis for manufacturing aluminum.

Figure 3:
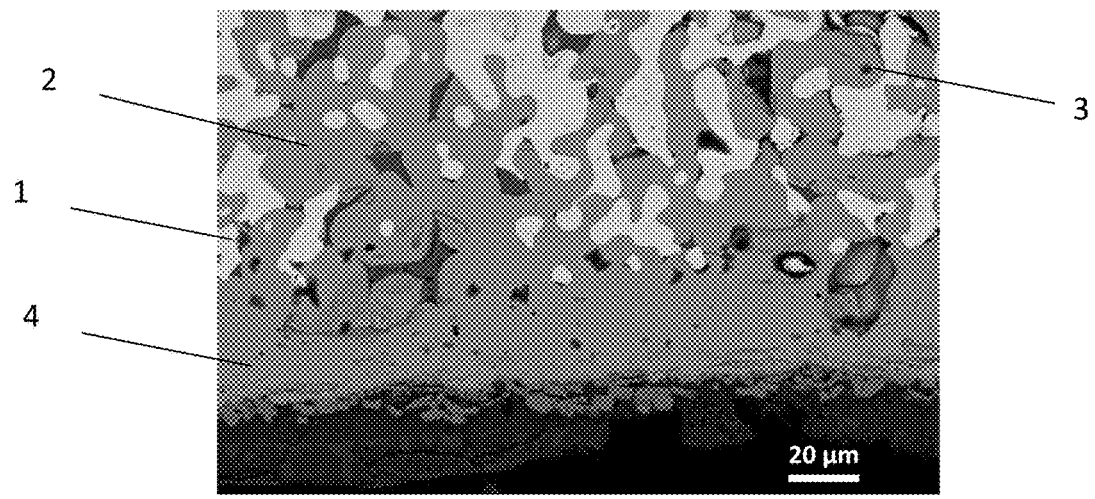
FIG. 3 is a photograph of an observation by backscattered electron SEM of a portion on the surface of the monolithic anode made up of a cermet material according to the invention which is shown in part in the photographs in FIGS. 1 and 2, after 96 hours of electrolysis at a current of 0.6 A/cm$^2$.
Figure 4:
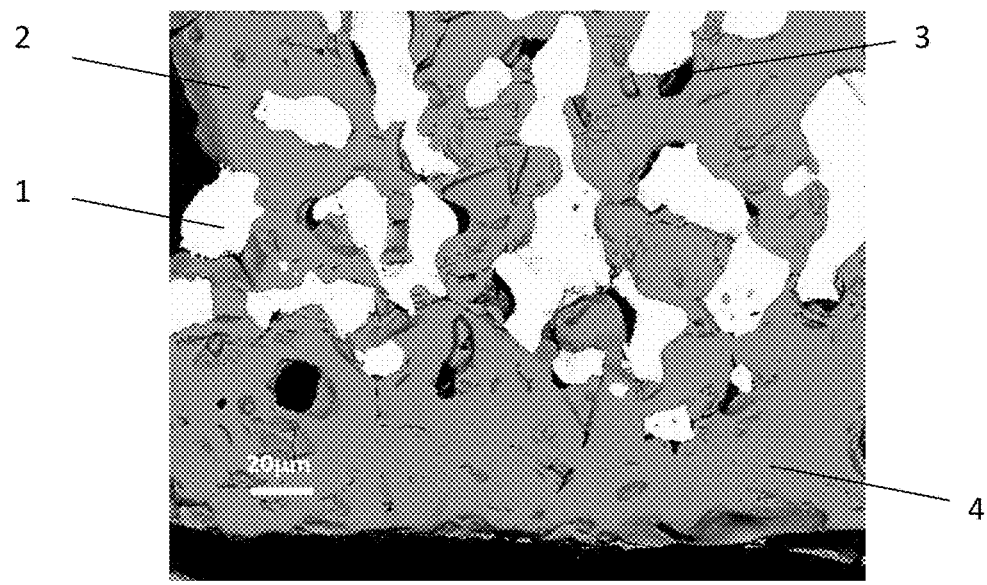
FIG. 4 is a photograph of an observation by backscattered electron SEM of a portion on the surface of the monolithic anode made up of a cermet material according to the invention which is shown in part in the photographs in FIGS. 1 and 2, after 506 hours of electrolysis at a current of 0.8 A/cm$^2$.

In addition, the nickel ferrite layer will be continuously renewed during electrolysis, as is shown in the photographs in FIGS. 3 and 4, which are photographs of an observation by backscattered electron SEM of a portion of the monolithic anode which is shown in part in the photographs in FIGS. 1 and 2, after 96 hours and 506 hours of electrolysis respectively.

In FIGS. 3 and 4 the protective layer of nickel ferrite which adheres on the periphery of the anode can be made out. The thickness of this protective layer is about 20 to 30 µm. Therefore after 96 hours and even 506 hours of electrolysis, the protective layer of nickel ferrite is still present on the surface of the anode with a substantially identical thickness.

Figure 5:
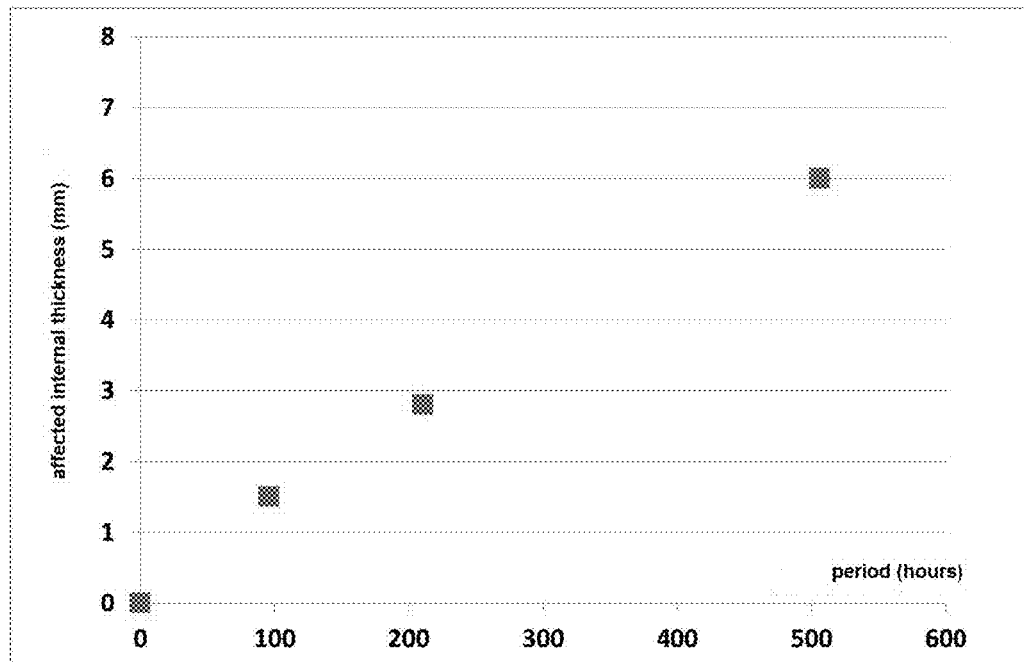
FIG. 5 is a graph showing the affected internal thickness of the monolithic anode shown in part in FIGS. 1 to 4 as a function of electrolysis time.

FIG. 5 is a graph showing the affected internal thickness of the monolithic anode shown in part in FIGS. 1 to 4 over a period of 506 hours of electrolysis.

"Affected internal thickness" means the thickness in which the composition of the material is different from the composition at the core of the anode, the core of the anode corresponding to the initial composition of the cermet material before electrolysis.

Given the graph in FIG. 5, it is noted that the affected internal thickness changes linearly and only slightly at a rate of 12 µm/hour over a period of 506 hours of electrolysis.

This graph reflects the excellent stability of the cermet material according to the invention which is resistant to the aggressive conditions found in a cryolite bath during electrolysis.

The wear of the anode material is very low, less than 0.2 mm after 506 hours of electrolysis.

Figure 6:
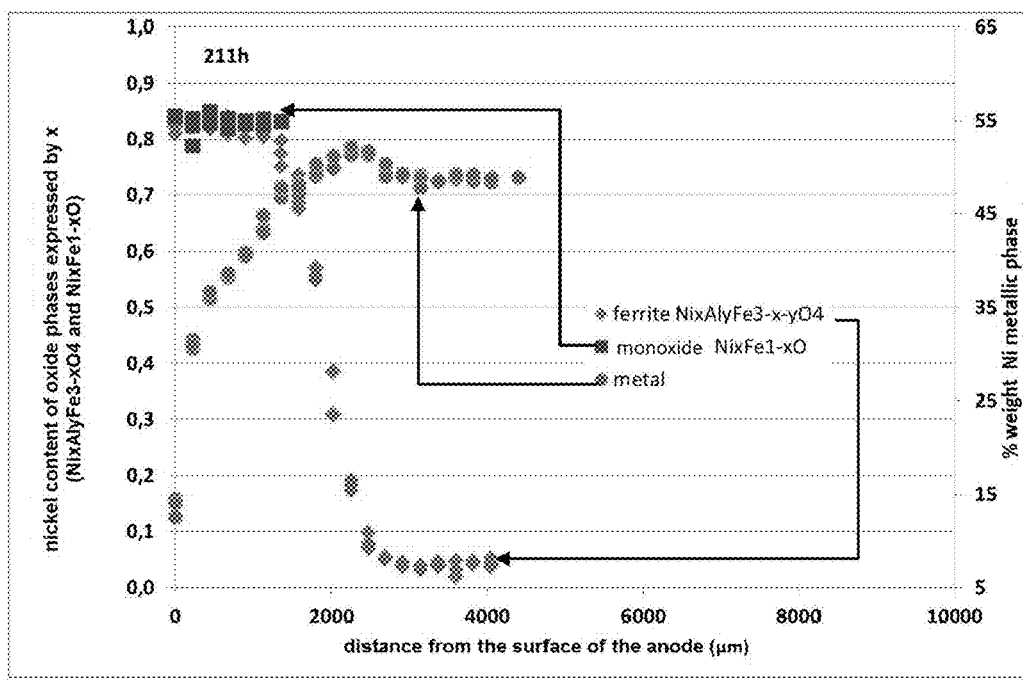
FIG. 6 is a graph showing the nickel content expressed in terms of the content x of the nickel ferrite oxide phases of composition $Ni_xAl_yFe_{3-x-y}O_4$ and monoxide of composition $Ni_xFe_{1-x}O$, and the content by mass of nickel in the metallic phase, as a function of the distance from the surface of the monolithic anode shown in part in FIGS. 1 to 4 after 211 hours of electrolysis.

FIG. 6 is a graph showing, after 211 hours of electrolysis, the nickel content expressed in terms of the content x of the nickel ferrite oxide phases of composition $Ni_xAl_yFe_{3-x-y}O_4$ and monoxide of composition $Ni_xFe_{1-x}O$, and the content by mass of nickel in the metallic phase, as a function of the distance from the surface of the monolithic anode shown in part in FIGS. 1 to 4.

Figure 7:
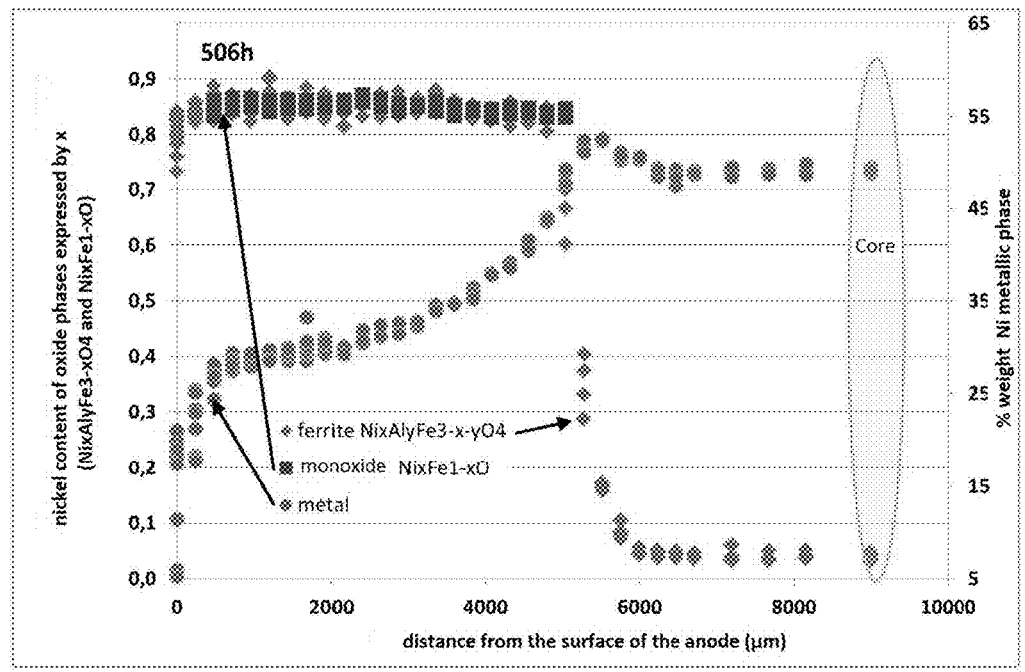
FIG. 7 is a graph showing the nickel content expressed in terms of the content x of the nickel ferrite oxide phases of composition $Ni_xAl_yFe_{3-x-y}O_4$ and monoxide of composition $Ni_xFe_{1-x}O$, and the content by mass of nickel in the metallic phase, as a function of the distance from the surface of the monolithic anode shown in part in FIGS. 1 to 4 after 506 hours of electrolysis.

FIG. 7 is a graph showing, after 506 hours of electrolysis, the nickel content expressed in terms of the content x of the nickel ferrite oxide phases of composition $Ni_xAl_yFe_{3-x-y}O_4$ and monoxide of composition $Ni_xFe_{1-x}O$, and the content by mass of nickel in the metallic phase, as a function of the distance from the surface of the monolithic anode shown in part in FIGS. 1 to 4.

Given the graphs in FIGS. 6 and 7 it is noted that the profiles of the amounts of nickel in the oxide phases and in the metallic phase are similar but offset towards the core of the anode. There is therefore a movement of a certain amount of nickel from the metallic phase to the oxide phases, all the more deeply from the surface of the anode as the electrolysis time increases.

The composition of the anode core remains unchanged. The modification front of the cermet material tends to move slowly from the surface to the core of the anode and a stable composition plateau forms on the surface of the anode.

These two graphs in FIGS. 6 and 7 show that the anode made up of a cermet material according to the invention remains stable during electrolysis and is therefore perfectly suitable for industrial use.

As shown in the graph in FIG. 7, the composition of the oxide phase stabilizes on the surface of the anode with a higher nickel content, in particular a nickel ferrite phase $Ni_xAl_yFe_{3-x-y}O_4$ with x close to 0.9, making this layer more resistant to corrosion by the cryolite bath. The metallic nickel phase enters either the nickel ferrite, or the monoxide phase. Nickel dissolves only slightly in the cryolite bath, which confirms the graph in FIGS. 6 and 7.

Figure 8:
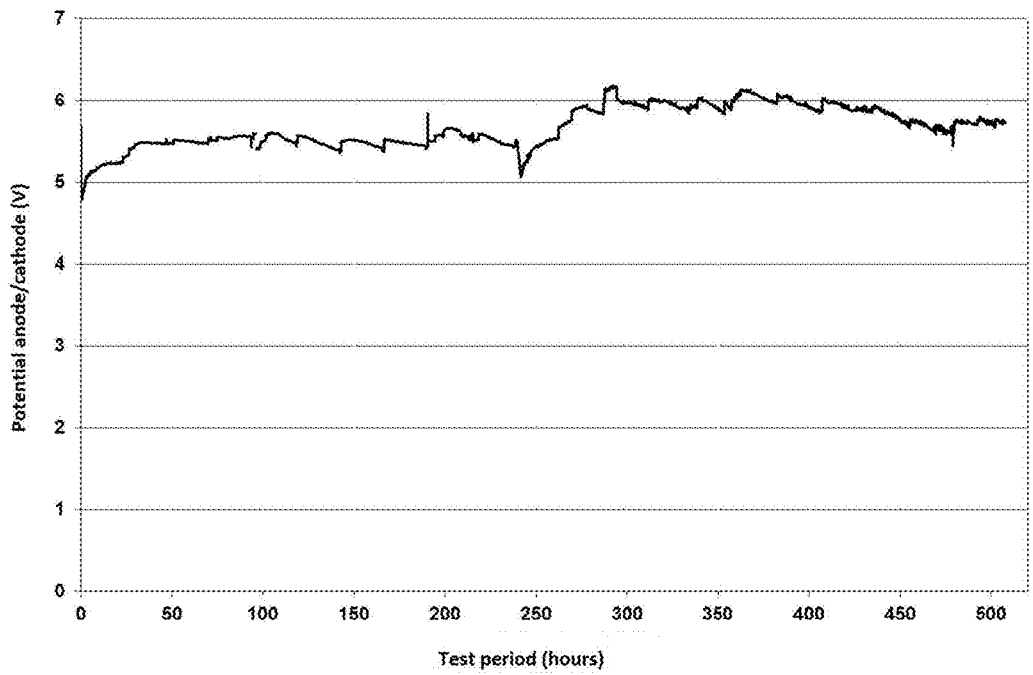
FIG. 8 is a graph showing the tracking of electrolysis potential over a period of 506 hours of the monolithic anode shown in part in FIGS. 1 to 4.

FIG. 8 is a graph showing the tracking of electrolysis potential over a period of 506 hours of the monolithic anode shown in part in FIGS. 1 to 4. It can be seen that the anode's behavior is stable. The advance of the modification front does not affect the electrolysis potential, in particular because of the large amount of metallic phase in the cermet material which maintains high conductivity.

Figure 9:
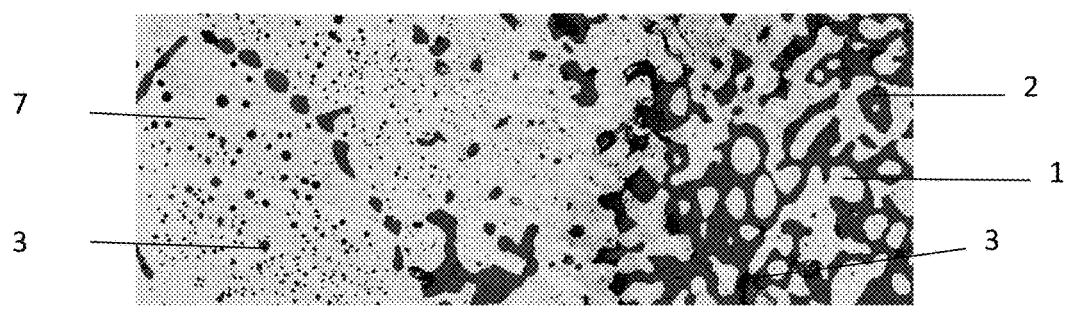
FIG. 9 is a photograph of an observation by backscattered electron SEM of a portion of the layer of a cermet material according to the invention that an anode made of a metallic core covered with said cermet material contains after sintering.

FIG. 9 is a photograph of an observation by backscattered electron SEM from the interface between the metallic core of composition $Ni_{65}Fe_{25}Cu_{10}$ and a cermet material according to the invention of an anode which was obtained after sintering at 1200° C. The cermet material comprised 68% of nickel ferrite oxide of composition $Ni_{0.04}Fe_{2.96}O_4$ and 32% of metal comprising 50% of Ni, 40% of Cu and 10% of Fe.

Figure 10:
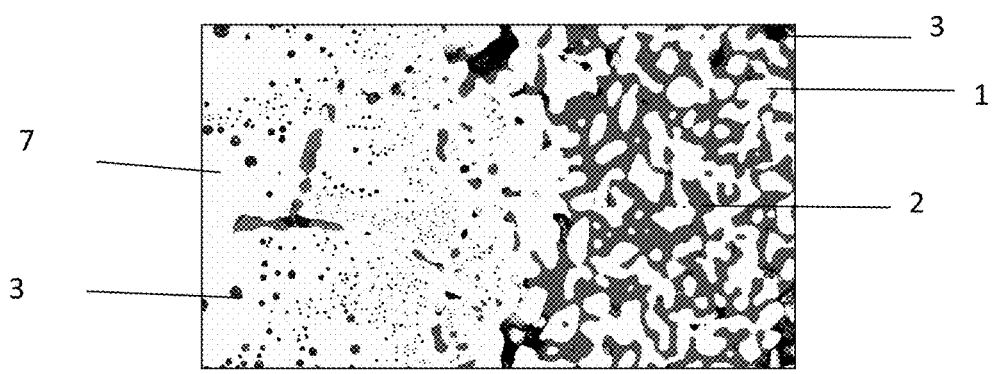
FIG. 10 is a photograph of an observation by backscattered electron SEM of the same portion of the layer of cermet material shown in FIG. 9 after 230 hours of electrolysis.

FIG. 10 is a photograph of an observation by backscattered electron SEM of this interface shown in FIG. 9 after 230 hours of electrolysis.

In FIGS. 9 and 10, phase 7 of the metallic core can be made out.

By comparing the two photographs in FIGS. 9 and 10, it is noted that the interface between the metallic core and the cermet material according to the invention of the anode is very similar and has therefore remained stable after 230 hours of electrolysis. The interface is cohesive and there was no infiltration of the bath after 230 hours of electrolysis. This demonstrates the stability during electrolysis of an anode made of a metallic core coated with a cermet material according to the invention.

Furthermore, no fluorine was identified at the interface. This means that the anode was not attacked by corrosion after 230 hours of electrolysis.

These experimental results also demonstrate the value from an industrial standpoint of the cermet material according to the invention when used as a coating for the metallic core of an electrode, and in particular an anode. Such an embodiment may be particularly advantageous to increase the service life of the anode because of the regeneration of the cermet material by means of migration of iron from the metallic core to the cermet material.

The invention claimed is:

1. Cermet material comprising as mass percentages, at least:
   50% to 90% of a metallic phase which contains at least one alloy of copper (Cu) and nickel (Ni), said at least one alloy comprising as percentages by mass:
   35% to 75% of nickel, and
   25% to 65% of copper, and
   10% to 50% of an oxide phase containing at least iron, nickel and oxygen with the following proportion by mass of nickel: $0.2\% \leq Ni \leq 17\%$.

2. Cermet material according to claim 1, characterized in that the at least one alloy of copper (Cu) and nickel (Ni) contains iron (Fe), the mass percentage of iron in said alloy not exceeding 20%.

3. Cermet material, comprising a cermet material according to claim 2 which is coated completely or partially with a protective layer of composition $Ni_{0.9}M_yFe_{2.1-y}O_4$.

4. Cermet material according to claim 3, characterized in that a thickness of the protective layer is between 15 and 30 μm.

5. Cermet material according to claim 2, characterized in that the percentage by mass of iron in the alloy of copper (Cu) and nickel (Ni) is between 2% and 15%.

6. Cermet material according to claim 1, characterized in that the oxide phase further contains at least one metal (M) selected from aluminum (Al), cobalt (Co), chromium (Cr), copper (Cu), manganese (Mn), titanium (Ti), zirconium (Zr), tin (Sn), vanadium (V), niobium (Nb), tantalum (Ta), yttrium (Y), and hafnium (Hf).

7. Cermet material according to claim 1, characterized in that said oxide phase comprises:
   a monoxide phase of composition $Ni_xM_yFe_{1-x-y}O$ with the following proportions by mass:
   $0.3\% \leq Ni \leq 17\%$,
   $60\% \leq Fe \leq 78\%$, and
   $0 \leq M \leq 10\%$,
   and/or
   a nickel ferrite oxide phase of composition $Ni_xM_yFe_{3-x-y}O_4$ with the following proportions by mass:
   $0.2\% \leq Ni \leq 13\%$,
   $60\% \leq Fe \leq 72\%$,
   $0 \leq M \leq 8\%$,
   M being a metal selected from aluminum (Al), cobalt (Co), chromium (Cr), copper (Cu), manganese (Mn), titanium (Ti), zirconium (Zr), tin (Sn), vanadium (V), niobium (Nb), tantalum (Ta), yttrium (Y), hafnium (Hf) or a combination of these metals.

8. Cermet material according to claim 7, characterized in that when said oxide phase comprises a nickel ferrite oxide phase, said nickel oxide ferrite phase is of composition $Ni_xM_yFe_{3-x-y}O_4$ with the following mass proportions:
$0.2\% \leq Ni \leq 10\%$,
$63\% \leq Fe \leq 72\%$, and
$0 \leq M \leq 4\%$.

9. Cermet material according to claim 8, characterized in that said nickel oxide ferrite phase has the following mass proportions:
$0.2\% \leq Ni \leq 5\%$,
$68\% \leq Fe \leq 72\%$, and
$0 \leq M \leq 4\%$.

10. Cermet material according to claim 7, characterized in that when the oxide phase of the cermet material comprises a monoxide phase, said monoxide phase is of composition $Ni_xM_yFe_{1-x-y}O$ with the following mass proportions:
$0.3\% \leq Ni \leq 13\%$,
$65\% \leq Fe \leq 78\%$, and
$0 \leq M \leq 4\%$.

11. Cermet material according to claim 10, characterized in that said monoxide phase has the following mass proportions:
$0.3\% \leq Ni \leq 8\%$,
$70\% \leq Fe \leq 78\%$, and
$0 \leq M \leq 4\%$.

12. Cermet material according to claim 1, characterized in that the metallic phase further comprises at least one rare earth element selected from yttrium (Y), cerium (Ce), lanthanum (La) and neodymium (Nd).

13. Cermet material obtained after a pre-oxidation treatment of a cermet material according to claim 1.

14. Cermet material according to claim 13, characterized in that the pre-oxidation treatment is carried out in air between 900° C. and 1000° C. for a time between 2 and 10 hours.

15. Cermet material according to claim 1, characterized in that the mass percentage of the metallic phase is 60% to 80% and the mass percentage of the oxide phase is 20% to 40%.

16. Cermet material according to claim 1, characterized in that the percentage by mass of nickel is 40% to 60% and the percentage by mass of copper is 40% to 55% in the alloy of copper (Cu) and nickel (Ni).

17. Electrode comprising a metallic core covered wholly or partially by at least one layer comprising a cermet material comprising as mass percentages:
   50% to 90% of a metallic phase which contains at least one alloy of copper (Cu) and nickel (Ni), said at least one alloy comprising as percentages by mass:
   35% to 75% of nickel, and
   25% to 65% of copper, and
   10% to 50% of an oxide phase containing at least iron, nickel and oxygen with the following proportion by mass of nickel: $0.2\% \leq Ni \leq 17\%$.

18. Electrode according to claim 17, characterized in that said metallic core comprises at least one alloy of nickel (Ni) and iron (Fe), with proportions by mass of Ni and Fe being the following:
$40\% \leq Ni \leq 85\%$, and
$15\% \leq Fe \leq 60\%$.

19. Electrode according to claim 18, characterized in that said metallic core further comprises copper (Cu) in the following mass proportion: $5\% \leq Cu \leq 40\%$.

20. Electrode according to claim 17, characterized in that the metallic core of the electrode comprises at least one metal A chosen from aluminum (Al), cobalt (Co), chromium (Cr), manganese (Mn), molybdenum (Mo), titanium (Ti), zirconium (Zr), tin (Sn), vanadium (V), niobium (Nb), tantalum (Ta), and hafnium (Hf) or a combination of these metals, the proportion by mass of metal A in the metallic core being as follows: $0.5\% \leq A \leq 30\%$.

21. Electrode according to claim 17, characterized in that the metallic core further comprises at least one rare earth element selected from yttrium (Y), cerium (Ce), lanthanum (La) and neodymium (Nd).

22. Electrode according to claim 17, characterized in that said layer comprising the cermet material is an intermediate layer arranged between the metallic core and a layer of oxide-rich cermet material or pure oxide.

23. Electrode according to claim 18, characterized in that the proportions by mass of Ni and Fe in the at least one alloy of nickel (Ni) and iron (Fe) are the following:
  55%≤Ni≤80%, and
  20%≤Fe≤45%.

24. Method of manufacturing a cermet material comprising as mass percentages:
  50% to 90% of a metallic phase which contains at least one alloy of copper (Cu) and nickel (Ni), said at least one alloy comprising as percentages by mass:
   35% to 75% of nickel, and
   25% to 65% of copper, and
  10% to 50% of an oxide phase containing at least iron, nickel and oxygen with the following proportion by mass of nickel: 0.2%≤Ni≤17%;
wherein the method comprises forming the cermet material using a power metallurgy method or a thermal spraying technique, characterized in that said method of manufacturing uses as raw materials comprising:
  iron in metallic form or as an alloy, and optionally copper and nickel in metallic form or as an alloy, and
  an oxide selected from nickel ferrite oxides $Ni_xFe_{3-x}O_4$, NiO, $Fe_2O_3$, CuO, $Cu_2O$, $CuFeO_2$, the spinel of type $Cu_xFe_{3-x}O_4$ with $0<x\leq1$.

25. Manufacturing method according to claim 24, characterized in that between 30% and 100% of the copper is supplied in the form of an oxide.

26. Manufacturing method according to claim 24, characterized in that between 30% and 100% of the iron is supplied in the form of metallic iron.

* * * * *